3,236,847
PROCESS FOR THE PREPARATION OF 2,3-DIHYDROXY-PYRAZINE
Giorgio Palamidessi, Milan, and Luigi Panizzi, Rome, Italy, assignors to Società Farmaceutici Italia, Milan, Italy, an Italian corporation
No Drawing. Filed Oct. 1, 1963, Ser. No. 312,843
Claims priority, application Italy, Oct. 4, 1962, 19,573/62
6 Claims. (Cl. 260—250)

Our invention relates to and has as an object a new process for the preparation of 2,3-dihydroxy-pyrazine, which is an intermediate in the synthesis of therapeutically useful sulphapyrazines as well as of pyrazine derivatives having industrial applications.

2,3-dihydroxy-pyrazine, which is a product known in the literature (F. G. McDonald et al.: J. Am. Chem. Soc., 69, 1947, p. 1034, and G. Karmas et al.: J. Am. Chem. Soc., 79, 1957, p. 680), represents a suitable intermediate in the synthesis of 3-methoxy-2-sulphanilamido-pyrazine and its derivatives (U.S. Patent 3,098,069).

As is known from the literature, 2,3-dihydroxy-pyrazine may be prepared by a sequence of eight steps starting from lumazine (F. G. McDonald and R. C. Ellingson: J. Am. Chem. Soc., 69, 1947, p. 1034) or by a sequence of four steps starting from pyrazine, or by demethoxylation of 2,3-dimethoxy-pyrazine in the warm and in the presence of sodium methoxide (G. Karmas and P. E. Spoerri: J. Am. Chem. Soc., 79, 1957, p. 684) or by the following three steps: condensation of aminomalonamide with glyoxal to yield 2-carboxamido-3-hydroxy-pyrazine (P. Jones: J. Am. Chem. Soc., 71, 1949, p. 78); Hoffmann degradation of 2-carboxyamido-3-hydroxy-pyrazine to yield 2-amino-3-hydroxy-pyrazine (McDonald et al.: J. Am. Chem. Soc., 69, 1947, page 1034); and Sandmeyer reaction on 2-amino-3-hydroxy-pyrazine to yield 2,3-dihydroxy-pyrazine (L Bernardi et al.: Gazz. Chim. It., 91, 1961, page 1434).

The first of the above procedures is obviously not practical and economical. Furthermore, the starting material, i.e. lumazine, is prepared by a laborious synthesis (Weijland et al.: J. Am. Chem. Soc., 67, 1945, p. 802). The second procedure is even less convenient because of the remarkable difficulty in having available 2,3-dimethoxy-pyrazine. The third procedure, obtained by combining three steps described by three different authors is not suitable because the third step, i.e. the Sandmeyer reaction on 2-amino-3-hydroxy-pyrazine, gives low yields.

We have found, and this is the object of the present invention, that 2,3-dihydroxy-pyrazine can be easily synthesized with good yields starting from inexpensive raw materials, through the following sequence of only three simple steps which are easily reproducible on an industrial scale. The process of the present invention, which will be illustrated hereinafter in detail, consists in condensing aminoacetaldehyde dialkylacetal with an aliphatic diester of oxalic acid to give the corresponding aliphatic N-(β-dialkoxyethyl)-oxamate (I), which is reacted with concentrated aqueous ammonia to give N-(β-dialkoxyethyl)-oxamide (II). This latter compound (II) is cyclized by heating in a lower aliphatic organic acid optionally in the presence of a hydrogen halide, to give the product 2,3-dihydroxy-pyrazine (III).

The process of the present invention may be represented by the following reaction scheme:

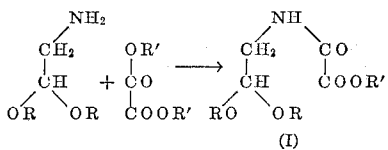
(I)

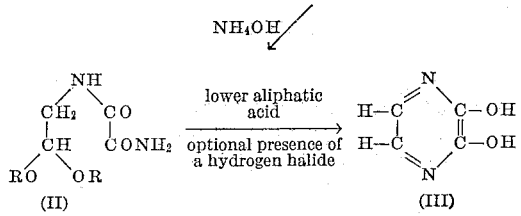

wherein R and R' are alkyl groups.

The dialkylacetal of aminoacetaldehyde, preferably diethylacetal, dissolved in a lower aliphatic alcohol, such as methanol or ethanol, is slowly added under stirring to a lower aliphatic diester of oxalic acid, such as dimethyl- or diethyloxalate, at a temperature of from $-5°$ to $+10°$ C., and preferably from $0°$ to $+5°$ C. The reaction is completed at room temperature in 30 to 120 minutes.

The solvent may be eliminated from the reaction mixture, first under ordinary pressure and then under reduced pressure. In order to isolate the alkyl N-(β-dialkoxyethyl)-oxamate, the residue may be rectified in vacuo. By treatment of alkyl N-(β-dialkoxyethyl)-oxamate with concentrated aqueous ammonia at room temperature for 1–3 hours N-(β-dialkoxyethyl)-oxamide is obtained with good yields. The final cyclization of N-(β-dialkoxyethyl)-oxamide is a very difficult reaction, which gives good yields of the desired product only under certain controlled experimental conditions, namely only when said cyclization is carried out in the warm, in a lower aliphatic acid, optionally in the presence of a hydrogen halide. Negative results are obtained when varying the experimental conditions: for instance practically no yields are obtained when the cyclization is carried out either by simple heating to a temperature of $250°$ C. in the optional presence of solvents or by heating in acetic acid in the presence of ammonium salts or by treatment in acetic acid in the presence of p.toluensulphonic acid or by heating in the presence of ammonium salts only. The cyclization from II to III is carried out with good yields and in a reproducible manner also on industrial scale, by heating product II in a lower aliphatic acid, such as formic acid, acetic acid or propionic acid, preferably at its boiling temperature. In order to have high and constant yields and to speed the reaction, it is advisable to operate in the presence of catalytic quantities, that is from 1 to 10% by weight with respect to the employed quantity of product II, of a hydrogen halide, preferably hydrochloric or hydrobromic acid as a saturated aqueous solution. The product III precipitates from the reaction mixture in crystalline form and after 15-60 minutes may be isolated by filtration.

The following examples are to illustrate, but not to limit, the invention:

*Example 1.—Ethyl N-ethylacetaloxamate*

A solution of 15 g. of aminoacetaldehyde diethylacetal in 25 cc. of ethanol is slowly added to a solution of 16.47 g. of diethyloxalate in 33 cc. of ethanol with stirring and at a temperature of from $0°$ to $+5°$ C. The reaction mixture is kept at room temperature for one hour. Then the solvent is evaporated off, the residue fractionally distilled in vacuo (4 mm. Hg) and the fraction boiling between $146°$ and $152°$ C. is collected. An average of 16 to 20 g. of product is obtained.

The same results may be obtained when dimethyloxalate is employed instead of diethyloxalate.

*Example 2.—N-ethylacetaloxamide*

31 g. of ethyl-N-ethylacetaloxamate are added to 125 cc. of concentrate ammonia at room temperature and with strong stirring. The precipitation of the product starts almost immediately. The reaction mixture is allowed to stand for one hour, then filtered and washed with water. An average of 24–26 g. of the product, which melts at 138–140° C., is obtained.

Example 3.—2,3-dihydroxy-pyrazine 7 g. of N-ethylacetaloxamide, 70 cc. of glacial acetic acid and 0.3 cc. of concentrated hydrochloric acid are refluxed for 20 to 30 minutes. After cooling, the crystalline product obtained is filtered. 2.5 to 3 g. of the product, which melts at 370–385° C. with decomposition (Fisher-Johns block), are obtained.

Example 4.—2,3-dihydroxy-pyrazine

The preparation is carried out in the same way as in Example 3, but without adding concentrated hydrochloric acid, and by refluxing the whole for 4 hours. 1.5 g. of 2,3-dihydroxy-pyrazine melting at 368–383° C. with decomposition are obtained.

Example 5.—2,3-dihydroxy-pyrazine

The preparation is carried out in the same way as in Example 3, but employing 99% formic acid or propionic acid, instead of glacialacetic acid. The same results are achieved.

Example 6.—2,3-dihydroxy-pyrazine

The preparation is carried out in the same way as in Example 3, but by employing concentrated hydrobromic acid instead of concentrated hydrochloric acid. The same results are achieved.

We claim:

1. A process of preparing 2,3-dihydroxy-pyrazine, which comprises (a) condensing an aliphatic diester of oxalic acid with an aminoacetaldehyde dialkylacetal at from −5° C. to +10° C. to give the corresponding aliphatic N-(β-dialkoxyethyl)-oxamate, (b) reacting said N-(β-dialkoxyethyl)-oxamate with aqueous concentrated ammonia to give the corresponding N-(β-dialkoxyethyl)-oxamide, and (c) cyclizing said N-(β-dialkoxyethyl)-oxamide by heating in a lower aliphatic carboxylic acid to give 2,3-dihydroxy-pyrazine.

2. The process of claim 1, wherein the lower aliphatic acid is formic acid.

3. The process of claim 1, wherein the lower aliphatic acid is acetic acid.

4. The process of claim 1, wherein the lower aliphatic acid is propionic acid.

5. A process of preparing 2,3-dihydroxy-pyrazine, which comprises (a) condensing an aliphatic diester of oxalic acid with an aminoacetaldehyde dialkylacetal at from −5° C. to +10° C. to give the corresponding aliphatic N-(β-dialkoxyethyl)-oxamate, (b) reacting said N-(β-dialkoxyethyl)-oxamate with aqueous concentrated ammonia to give the corresponding N-(β-dialkoxyethyl)-oxamide, and (c) cyclizing said N-(β-dialkoxyethyl)-oxamide by heating in a lower aliphatic carboxylic acid in the presence of a catalytic quantity of a hydrogen halide from the group consisting of hydrochloric acid and hydrobromic acid.

6. A process of preparing 2,3-dihydroxy-pyrazine, which comprises (a) condensing an aliphatic diester of oxalic acid with an aminoacetaldehyde dialkylacetal at from −5° C. to +10° C. to give the corresponding aliphatic N-(β-dialkoxyethyl)-oxamate, (b) reacting said N-(β-dialkoxyethyl)-oxamate with aqueous concentrated ammonia to give the corresponding N-(β-dialkoxyethyl)-oxamide, and (c) cyclizing said N-(β-dialkoxyethyl)-oxamide by heating in a lower aliphatic carboxylic acid in the presence of an aqueous solution containing 1 to 10% by weight of a hydrogen halide from the group consisting of hydrochloric acid and hydrobromic acid.

No references cited.

NICHOLAS S. RIZZO, *Primary Examiner.*